(12) United States Patent
Jiang

(10) Patent No.: US 10,796,450 B2
(45) Date of Patent: Oct. 6, 2020

(54) HUMAN HEAD DETECTION METHOD, ELETRONIC DEVICE AND STORAGE MEDIUM

(71) Applicant: Tencent Technology (Shenzhen) Company Limited, Shenzhen (CN)

(72) Inventor: Deqiang Jiang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 70 days.

(21) Appl. No.: 16/299,866

(22) Filed: Mar. 12, 2019

(65) Prior Publication Data

US 2019/0206083 A1 Jul. 4, 2019

Related U.S. Application Data

(63) Continuation of application No. PCT/CN2018/070008, filed on Jan. 2, 2018.

(30) Foreign Application Priority Data

Jan. 16, 2017 (CN) .......................... 2017 1 0029244.6

(51) Int. Cl.
*G06K 9/00* (2006.01)
*G06T 7/73* (2017.01)
(Continued)

(52) U.S. Cl.
CPC ............ *G06T 7/74* (2017.01); *G06K 9/00362* (2013.01); *G06K 9/00778* (2013.01);
(Continued)

(58) Field of Classification Search
None
See application file for complete search history.

(56) References Cited

U.S. PATENT DOCUMENTS 10,607,331 B1 * 3/2020 Tandia ..................... G06T 7/11
2005/0147292 A1 * 7/2005 Huang ............... G06K 9/00228
382/159
(Continued)

FOREIGN PATENT DOCUMENTS

CN       104922167 A    10/2015
CN       105005774 A    10/2015
(Continued)

OTHER PUBLICATIONS

Yan, Zhennan & Zhan, Yiqiang & Peng, Zhigang & Liao, Shu & Shinagawa, Yoshihisa & Metaxas, Dimitris & Zhou, Xiang. (2015). Bodypart Recognition Using Multi-stage Deep Learning. Information processing in medical imaging : proceedings of the . . . conference. 24. 449-61. 10.1007/978-3-319-19992-4_35. (Year: 2015).*
(Continued)

*Primary Examiner* — Hadi Akhavannik
(74) *Attorney, Agent, or Firm* — Brinks Gilson & Lione

(57) ABSTRACT

A method for detecting and tracking human head in an image by an electronic device is disclosed. The method may include segmenting the image into one or more sub-images; inputting each sub-image to a convolutional neural network trained according to training images having marked human head positions; outputting by a preprocessing layer of the convolutional neural network comprising a first convolutional layer and a pooling layer, a first feature corresponding to each sub-image; mapping through a second convolutional layer the first feature corresponding to each sub-image to a second feature corresponding to each sub-image; mapping through a regression layer the second feature corresponding to each sub-image to a human head position corresponding to each sub-image and a corresponding confidence level of the human head position; and filtering, according to the corresponding confidence level, human head positions cor-
(Continued)

responding to the one or more sub-images, to acquire detected human head positions in the image.

20 Claims, 10 Drawing Sheets

(51) Int. Cl.
    *G06T 7/10*     (2017.01)
    *G06T 7/20*     (2017.01)
    *G06K 9/62*     (2006.01)
    *G07C 9/00*     (2020.01)
    *G06N 3/08*     (2006.01)

(52) U.S. Cl.
    CPC ......... *G06K 9/6201* (2013.01); *G06K 9/6256* (2013.01); *G06N 3/082* (2013.01); *G06T 7/10* (2017.01); *G06T 7/20* (2013.01); *G07C 9/00* (2013.01); *G06T 2207/10016* (2013.01); *G06T 2207/20021* (2013.01); *G06T 2207/20081* (2013.01); *G06T 2207/20084* (2013.01); *G06T 2207/30196* (2013.01); *G06T 2207/30242* (2013.01)

(56) References Cited

U.S. PATENT DOCUMENTS

| | | | | |
|---|---|---|---|---|
| 2005/0286753 | A1* | 12/2005 | Ho | H04N 17/04 382/141 |
| 2014/0307076 | A1* | 10/2014 | Deutsch | F16P 3/147 348/77 |
| 2017/0351936 | A1* | 12/2017 | Jiang | G06K 9/6256 |
| 2019/0325605 | A1* | 10/2019 | Ye | G06T 7/73 |
| 2020/0110930 | A1* | 4/2020 | Simantov | G06N 20/00 |
| 2020/0167593 | A1* | 5/2020 | Kim | G06N 3/105 |

FOREIGN PATENT DOCUMENTS

| | | |
|---|---|---|
| CN | 105740758 A | 7/2016 |
| CN | 106022295 A | 10/2016 |
| CN | 106845383 A | 6/2017 |

OTHER PUBLICATIONS

International Search Report and Written Opinion from corresponding international application No. PCT/CN2017/070008, 10 pgs., dated Mar. 30, 2018.

\* cited by examiner

HUMAN HEAD DETECTION METHOD, ELETRONIC DEVICE AND STORAGE MEDIUM

RELATED APPLICATION

This application is a continuation application of the International PCT Application No. PCT/CN2018/070008, filed with the Chinese Patent Office on Jan. 2, 2018 and claims priority to Chinese Patent Application No. 2017100292446, filed with the Chinese Patent Office on Jan. 16, 2017 and entitled "HUMAN HEAD DETECTION METHOD AND APPARATUS", which is incorporated herein by reference in its entirety.

FIELD OF THE TECHNOLOGY

This application relates to the technical field of image processing, and in particular, to a method, an electronic device and a storage medium for human head detection.

BACKGROUND OF THE DISCLOSURE

Human head detection refers to the detection of the head of a human body in an image, and a result of the human head detection has various applications, such as applications in the field of security. At present, the human head detection is implemented mainly based on a shape and color of a human head. At present, a specific process of the human head detection includes: first, binarizing image pixels, and then performing edge detection to acquire a substantially circular edge; and then using circle detection to acquire a position and size of the circular edge, and then performing gray scale and size determination on a corresponding circular area in the original image to obtain human head detection.

However, currently, the human head detection relies on an assumption that the shape of the human head is circular. In fact, the shape of the human head is not strictly circular, and the shapes of the human heads of different person are also different. As a result, during the current human head detection, some human heads miss the detection and accuracy of the result of the human head detection is relatively low.

SUMMARY

According to various embodiments provided by this disclosure, methods, an electronic devices and a storage media are provided for implementing human head detection in images.

A human head detection method includes:

segmenting, by an electronic device, an image to be detected into one or more sub-images;

inputting, by the electronic device, each sub-image to a convolutional neural network trained according to a training image having a marked human head position respectively, and outputting, by a preprocessing layer including a convolutional layer and a pooling layer in the convolutional neural network, a first feature corresponding to each sub-image;

mapping, by the electronic device through a convolutional layer after the preprocessing layer in the convolutional neural network, the first feature corresponding to each sub-image to a second feature corresponding to each sub-image;

mapping, by the electronic device through a regression layer in the convolutional neural network, the second feature corresponding to each sub-image to a human head position corresponding to each sub-image and a corresponding confidence level of the human head position; and filtering, by the electronic device according to the corresponding confidence level, the human head position corresponding to each sub-image, to acquire a human head position detected in the image to be detected.

An electronic device includes a memory and a processor, the memory storing a computer readable instruction, the computer readable instruction, when executed by the processor, causing the processor to perform the following steps:

segmenting an image to be detected into one or more sub-images;

inputting each sub-image to a convolutional neural network trained according to a training image having a marked human head position respectively, and outputting, by a preprocessing layer including a convolutional layer and a pooling layer in the convolutional neural network, a first feature corresponding to each sub-image;

mapping, through a convolutional layer after the preprocessing layer in the convolutional neural network, the first feature corresponding to each sub-image to a second feature corresponding to each sub-image;

mapping, through a regression layer of the convolutional neural network, the second feature corresponding to each sub-image to a human head position corresponding to each sub-image and a corresponding confidence level of the human head position; and filtering, according to the corresponding confidence level, the human head position corresponding to each sub-image, to acquire the human head position detected in the image to be detected.

One or more non-volatile storage media storing a computer readable instruction is provided, the computer readable instruction, when executed by one or more processors, causing the processor to perform the following steps:

segmenting an image to be detected into one or more sub-images;

inputting each sub-image to a convolutional neural network trained according to a training image having a marked human head position respectively, and outputting, by a preprocessing layer including a convolutional layer and a pooling layer in the convolutional neural network, a first feature corresponding to each sub-image;

mapping, through a convolutional layer after the preprocessing layer in the convolutional neural network, the first feature corresponding to each sub-image to a second feature corresponding to each sub-image;

mapping, through a regression layer in the convolutional neural network, the second feature corresponding to each sub-image to a human head position corresponding to each sub-image and a corresponding confidence level of the human head position; and filtering, according to the corresponding confidence level, the human head position corresponding to each sub-image, to acquire the human head position detected in the image to be detected.

Details of one or more embodiments of this application are put forward in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions of the embodiments of this application more clearly, the following briefly introduces the accompanying drawings required for describing the embodiments. The accompanying drawings described below are only some embodiments of this application, and a person of ordinary skill in the art can obtain other accompanying drawings according to these accompanying drawings without creative efforts.

DESCRIPTION OF EMBODIMENTS

To make the objectives, technical solutions, and advantages of this application clearer, the following disclosure further describes this application in detail with reference to the accompanying drawings and embodiments. It should be understood that specific embodiments described herein are merely intended to explain this application and are not intended to limit this application.

While the disclosure herein specifically refer to human head detection in top view images, the underlying principle may be applied to detection of other objects in any type of images. For example, the systems and methods disclosed below may be applied to detection of motor vehicles in satellite images for monitoring traffic and the like.

Figure 1:
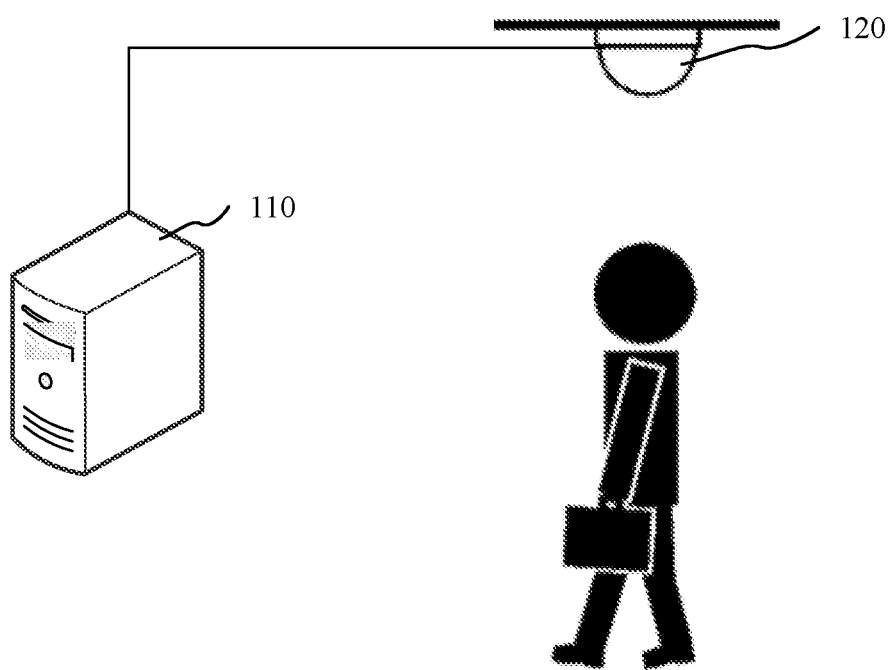
FIG. 1 shows an application environment diagram of a human head detection method according to an embodiment.

FIG. 1 is an application environment diagram of a human head detection method according to an embodiment. Referring to FIG. 1, the human head detection method is applied to a human head detection system, which includes an electronic device 110 and a top view camera 120 connected to the electronic device 110. The top view camera 120 is configured to capture an image to be detected and send the image to be detected to the electronic device 110. The top view camera may be mounted on the top of a building or at a wall above the height of a person (or a predetermined height) or at a corner of the top of the building, so that the top view camera can capture images of a top view angle. The top view may be orthographic top view or top view of an oblique angle (alternatively referred to as perspective top view).

In an embodiment, the electronic device 110 may be configured to segment an image to be detected into one or more sub-images; input each sub-image to a convolutional neural network trained according to training images having marked human head positions (or labeled with human heads) y, and output, by a preprocessing layer including at least one convolutional layer and at least one pooling layer in the convolutional neural network, a first feature corresponding to each sub-image; map, through at least one another convolutional layer after the preprocessing layer in the convolutional neural network, the first feature corresponding to each sub-image to a second feature corresponding to each sub-image; map, through at least one regression layer of the convolutional neural network, the second feature corresponding to each sub-image to a human head position corresponding to each sub-image and a corresponding confidence level of the human head position; and filter, according to the corresponding confidence level, the human head position corresponding to each sub-image, to acquire a human head positions detected in the image to be detected.

Figure 2:
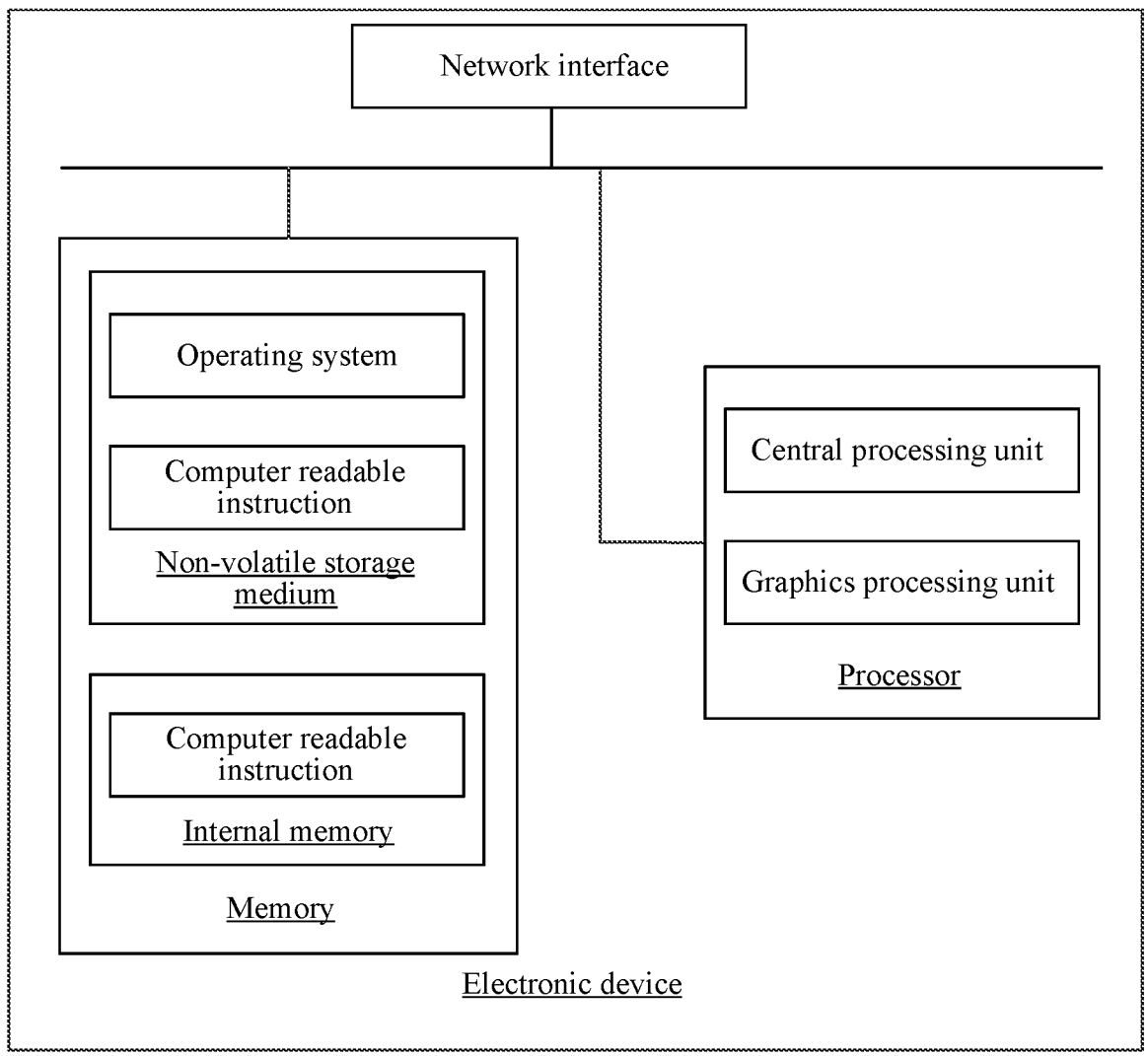
FIG. 2 shows a schematic diagram of an internal structure of an electronic device according to an embodiment.

FIG. 2 is a schematic diagram of an internal structure of an electronic device according to an embodiment. Referring to FIG. 2, the electronic device includes a processor, a memory and a network interface which are connected by a system bus. The memory includes a non-volatile storage medium and an internal memory. The non-volatile storage medium of the computer device may store an operating system and computer readable instructions. When being executed, the computer readable instruction may cause the processor to perform a human head detection method. The processor of the electronic device may include a central processing unit and a graphics processing unit. The processor is configured to provide computing and control capabilities to support operation of the electronic device. The internal memory may store the computer readable instruction. When being executed by the processor, the computer readable instruction may cause the processor to perform a human head detection method. The network interface of the electronic device is configured to be connected to the top view camera. The electronic device may be implemented by a integrated electronic device or a cluster including multiple electronic devices. The electronic device may be a personal computer, a server or a dedicated human head detection device. Those having ordinary skills in the art can understand that the structure shown in FIG. 2 is only a block diagram of a part of the structure related to the solution of this application, and does not constitute limitation on the electronic device to which the solution of this application is applied. The specific electronic device may include more or fewer components than those shown in the figure, or may combine some components, or have different component arrangement.

Figure 3:
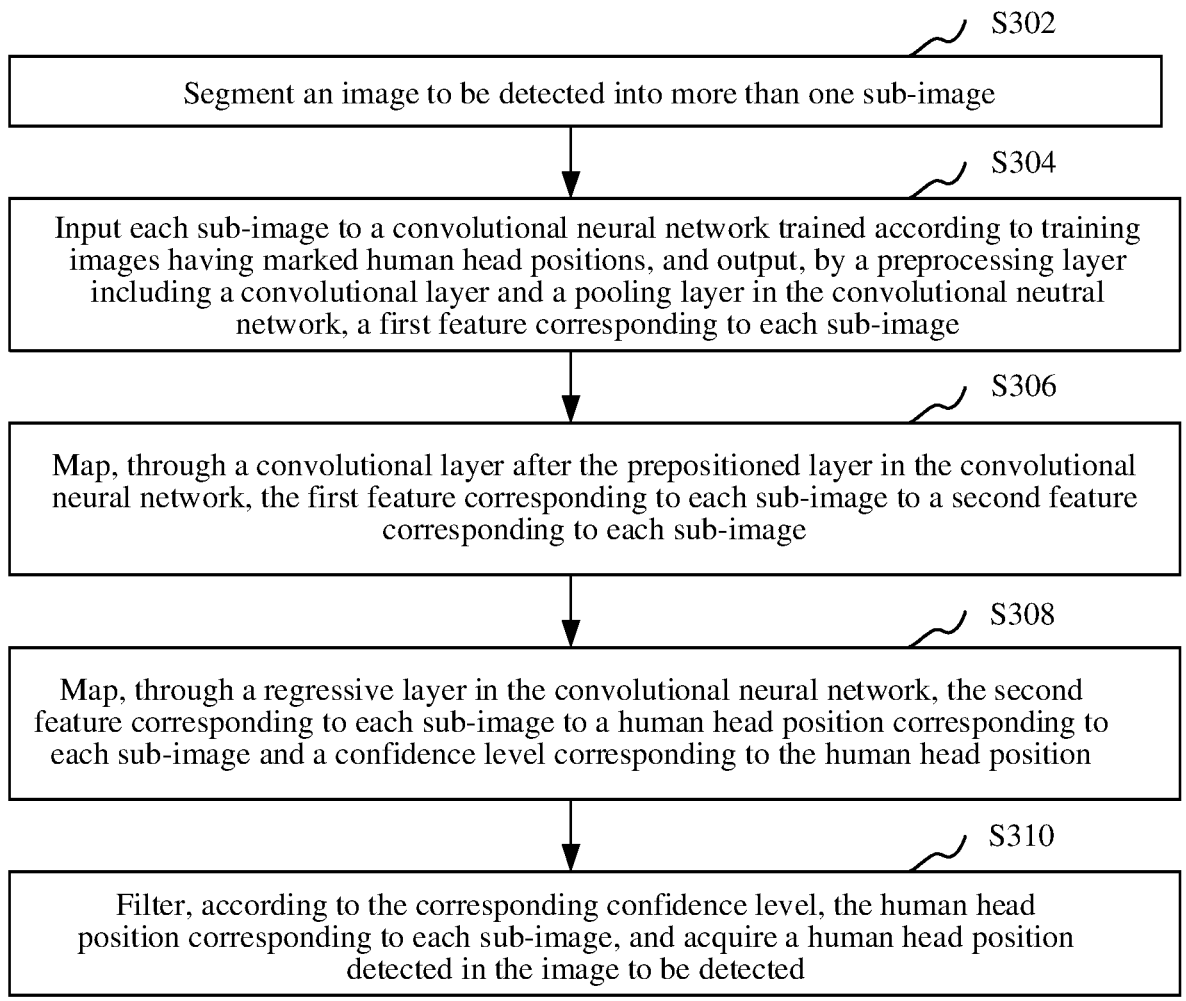
FIG. 3 shows a schematic flowchart of a human head detection method according to an embodiment.

FIG. 3 is a schematic flowchart of a human head detection method according to an embodiment. This embodiment is mainly illustrated by applying the method to the electronic device 110 in above FIG. 1 and FIG. 2. Referring to FIG. 3, the human head detection method specifically includes the following steps:

S302: Segment an image to be detected into one or more sub-images.

The image to be detected is an image on which human head detection needs to be performed. The image to be detected may be a picture or a video frame in a video. The sub-images are images which are segmented from the image to be detected and have a size smaller than the image to be detected. All segmented sub-images may have the same size or different sizes.

Specifically, the electronic device may traverse a window of a fixed size in the image to be detected according to a transverse step size and a longitudinal step size, thereby segmenting the sub-images having the same size as the window size from the image to be detected during the traversal process. The segmented sub-images may be combined to the image to be detected.

In an embodiment, step S302 includes: segmenting the image to be detected to one or more sub-images of a fixed size, adjacent sub-images in the segmented sub-images having an overlapping part.

The adjacent sub-images refer to that positions of the sub-images in the image to be detected are adjacent, and the adjacent sub-images may partially overlap. Specifically, the electronic device may traverse the window of a fixed size in the image to be detected according to the transverse step size smaller than a window width and the longitudinal step size smaller than a window height, to acquire one or more sub-images of the same size, and adjacent sub-images have an overlapping part.

In this embodiment, there is an overlapping part between the segmented adjacent sub-images, thereby ensuring that the adjacent sub-images have higher correlation, and improving accuracy of detecting a human head position from the image to be detected, particularly when a human head lies at boundary between the adjacent sub-images.

S304: Input each sub-image to a convolutional neural network trained according to a set of training images having marked human head positions, and output, by a preprocessing layer including at least one convolutional layer and at least one pooling layer in the convolutional neural network, a first feature corresponding to each sub-image.

The Convolutional Neural Network (CNN) is an artificial intelligence neural network. The convolutional neural network includes a preprocessing layer having at least one convolutional layer and at least one pooling layer. The convolutional neural network used in this embodiment may be directly constructed, and may alternatively be acquired by reconstructing an existing convolutional neural network. A computational task in the convolutional neural network may be implemented by a central processing unit or a graphics processing unit. Time consumed by the central processing unit for human head detection is proximately a level of seconds, and time consumed by the graphics processing unit for human head detection may be reduced to a level of hundred milliseconds, thereby realizing real-time human head detection.

In the convolutional layer in the convolutional neural network, there are a plurality of feature maps, each feature map includes a plurality of neurons, and all neurons of the same feature map share one convolution kernel. The convolution kernel provides a weight of the corresponding neuron, and the convolution kernel represents a feature. The convolution kernel is generally initialized in a form of a random decimal matrix, and a proper convolution kernel will be learned during training of the network to represent a feature. The convolutional layer can reduce connection between various layers in the neural network, and in addition, a risk of overfitting is reduced.

Pooling may take two exemplary forms of implementation: mean pooling and max pooling. Pooling may be considered as a special convolutional process. Convolution and pooling greatly simplify complexity of the neural network and reduce parameters of the neural network.

The training images having human heads therein may be pre-marked (or labeled) with human head positions For example, human head positions in the training images may be manually marked or labeled, or may be marked or labeled using other automatic means. The training images having the marked human head positions and the image to be detected may be images captured in the similar scene, setting or background, thereby further improving the accuracy of human head detection. The training image having marked human head positions can be of the same size or different sizes as the image to be detected.

In an embodiment, when the convolutional neural network is trained, a confidence level may be assigned to the human head position marked in the training image. The training image is segmented into one or more sub-images according to the same segmentation manner as that of the image to be detected. The segmented sub-images are separately input to the convolutional neural network, and the convolutional neural network outputs human head positions and confidence levels. A difference between the output head positions and the marked head position is calculated, and a difference between the corresponding confidence levels is calculated. According to the two differences, parameters of the convolutional neural network are adjusted. The training is continued until a termination condition is reached. The termination condition may be that each difference is less than a preset difference threshold, or the number of iterations reaches a preset number of times.

The preprocessing layer is used above as a general term of other layers in the convolutional neural network except for the regression layer and a convolutional layer before the regression layer. The preprocessing layer may include at least one convolutional layer and at least one pooling layer. The preprocessing layer may include parallel convolutional layers, and data output by the parallel convolutional layers may be spliced and input to a next layer. The last layer in the preprocessing layer may be a convolutional layer or a pooling layer. The preprocessing layer may include multiple pairs of convolutional layer and pooling layer connected in tandem. The preprocessing layer may include additional rectifying layers.

S306: Map, through a convolutional layer after the preprocessing layer in the convolutional neural network, a first feature corresponding to each sub-image to a second feature corresponding to each sub-image.

A conventional convolutional neural network is generally used for classification, and the preprocessing layer in the convolutional neural network for classification is followed by a fully connected layer. The fully connected layer may map the first feature output by the preprocessing layer to probability data corresponding to each preset type (or class). Therefore, a type to which an input image belongs may be determined by the regression layer. In this embodiment, the convolutional neural network is used for human head detection rather than classification. As such, the convolutional layer is configured to replace the fully connected layer, and to output the second feature for describing the sub-image features. The number of the second features corresponding to each sub-image may be plural.

S308: Map, through a regression layer in the convolutional neural network, the second feature corresponding to each sub-image to a human head position corresponding to each sub-image and a confidence level corresponding to the human head position.

The human head position may be represented by a position of a rectangular box bounding a human head in the image. The position of the rectangular box may be represented by a quadruple. The quadruple may include a horizontal coordinate and a longitudinal coordinate of one vertex of the rectangular box and a width and a height of the rectangular box. Alternatively, the quadruple may include a horizontal coordinate and a longitudinal coordinate of each of two diagonal vertexes of the rectangular box. The confidence level output by the regression layer are in a one-to-one correspondence with the human head position output by the regression layer, thereby indicating a probability that the corresponding rectangular box does correspond to a human head at the corresponding position in the image. The regression layer may use a support vector machine (SVM).

In an embodiment, step S308 includes: mapping, through the convolutional layer in the regression layer in the convolutional neural network, the second feature corresponding to each sub-image to the human head position corresponding to each sub-image and the confidence level corresponding to the human head position. Specifically, the electronic device may directly map the second feature corresponding to each sub-image to the human head position corresponding to each sub-image and the confidence level corresponding to the human head position through the same convolutional layer in the regression layer in the convolutional neural network.

In an embodiment, step S308 includes: mapping, through a first convolutional layer in the regression layer in the convolutional neural network, the second feature corresponding to each sub-image to the human head position corresponding to each sub-image; and mapping, through a second convolutional layer in the regression layer in the convolutional neural network, the second feature corresponding to each sub-image to the confidence level corresponding to the output human head position.

Figure 4:
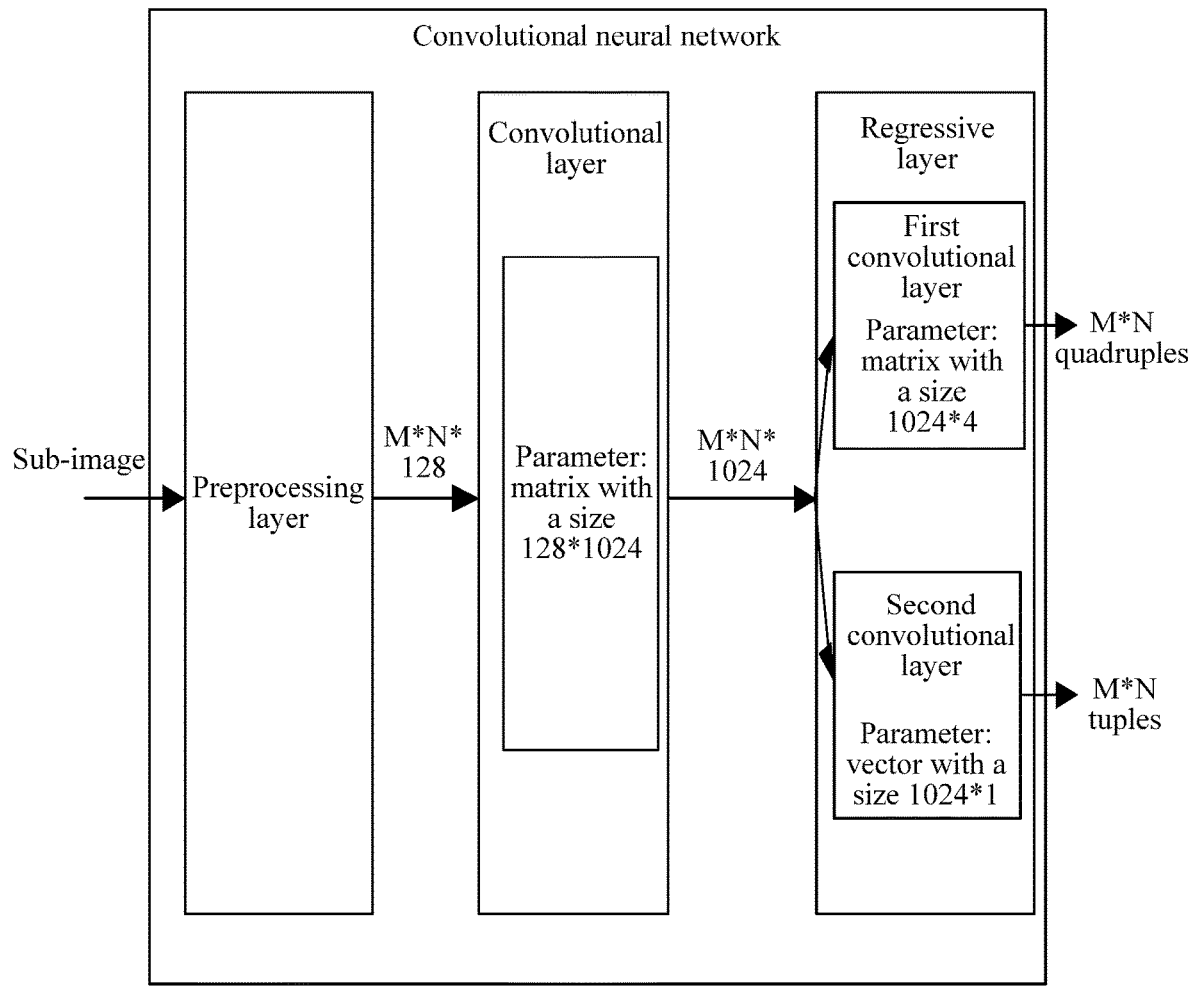
FIG. 4 shows a schematic structural diagram of a convolutional neural network according to an embodiment.

For example, referring to FIG. 4, the sub-image outputs 128 feature matrices (feature maps) each with a size M*N through the preprocessing layer in the convolutional neural network. 128 is a preset value for number of features, and can be set as needed. M and N are determined by parameters of the preprocessing layer. The 128 feature matrices with the size M*N are input to the convolutional layer after the preprocessing layer. By performing convolution processing by using a parameter matrix with a size 128*1024 in the convolutional layer, M*N feature vectors with a length 1024 are output. The M*N feature vectors with the length 1024 are input to the first convolutional layer in the regression layer, and are convoluted by a parameter matrix with a size 1024*4 in the first convolutional layer, and M*N quadruples representing the human head position are output. The M*N feature vectors with the length 1024 are input to the second convolutional layer in the regression layer, and are convoluted by a parameter vector with a size 1024*1 in the second convolutional layer, and M*N tuples indicating the confidence level the human head position are output. A correspondence relationship between the human head position and the confidence level is embodied in an order of the output M*N quadruples and the tuples.

S310: Filter, according to the corresponding confidence level, the human head position corresponding to each sub-image, and acquire a human head position detected in the image to be detected.

Specifically, the electronic device may compare the confidence level of each human head position output by the convolutional neural network with a confidence level threshold, and filter out human head positions of which confidence levels are less than the confidence level threshold. The electronic device may further filter the human head positions, of which areas are smaller than a preset area, in the human head positions filtered by using the confidence level threshold. The electronic device may cluster the filtered human head positions to combine the plurality of human head positions of the same type to acquire one combined human head position in the image to be detected, or select one of the plurality of human head positions clustered to the same type as the human head position in the image to be detected.

According to the foregoing human head detection method, the convolutional neural network is trained in advance based on the training images having the marked human head position, and the convolutional neural network can automatically learn human head features. The trained convolutional neural network can automatically extract appropriate features from the sub-images to output candidate human head positions and corresponding confidence levels, and then filter, according to the confidence levels, to acquire the human head position in the image to be detected. The human head shape is learned rather than pre-assumed. As such a missed detection caused by presuming the shape of the human head can be avoided, and accuracy of the human head detection is improved. Moreover, in the convolutional neural network, the first features of the sub-images are output by the preprocessing layer including the convolutional layer and the pooling layer, and the second features are outputted by the convolutional layer after the preprocessing layer and before the regression layer to accurately describe human head features in the sub-images. Therefore, the second features are directly mapped to the human head positions and confidence levels by the regression layer, which is new application of the convolutional neural network of the new structure. Compared with the traditional circle detection, the accuracy of the human head detection is greatly improved.

Figure 5:
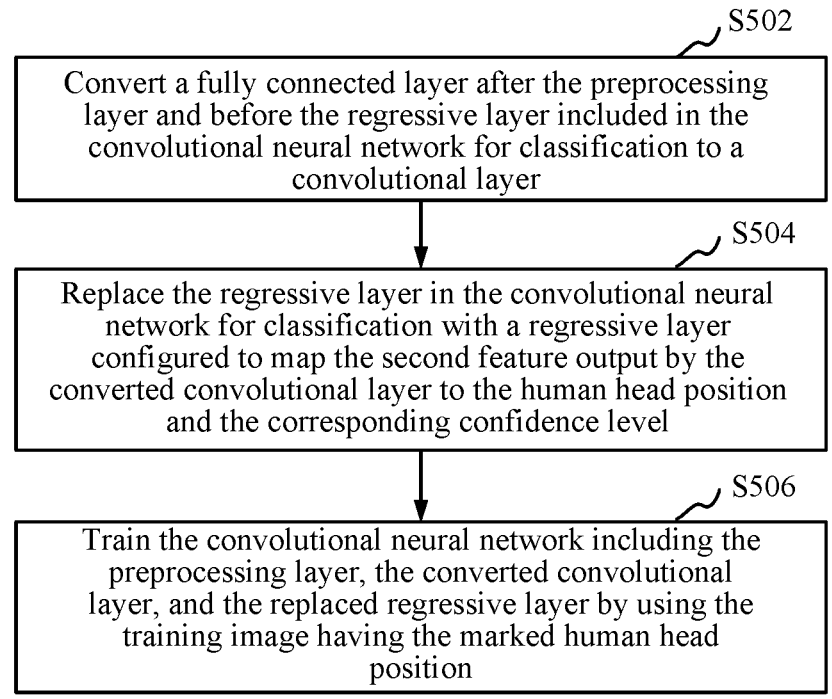
FIG. 5 shows a schematic flowchart for converting a convolutional neural network for image classification to a convolutional neural network for human head detection.

In an embodiment, before step S302, the human head detection method further includes a step of converting and training the convolutional neural network for classification to a convolutional neural network for human head detection. Referring to FIG. 5, the step of converting and training the convolutional neural network for classification to a convolutional neural network for human head detection includes the following steps:

S502: Convert a fully connected layer after the preprocessing layer and before the regression layer included in the convolutional neural network for classification to a convolutional layer.

A conventional convolutional neural network for classification is a trained convolutional neural network which can classify images input to the convolutional neural network, such as GoogleNet, VGGNET, or AlexNet. The convolutional neural network for classification includes the preprocessing layer, the fully connected layer, and the regression layer. The fully connected layer is configured to output second features corresponding to each preset type (or class) of the conventional classification application.

The sparse connection and weight sharing of the fully connected layer and the convolutional layer are different. Each neuron of the fully connected layer is connected to all neurons of a preceding layer. Both the convolutional layer and the fully connected layer acquire input of a next layer by multiplying output of the preceding layer by a parameter matrix. As such, the conventional fully connected layer can be converted to the convolutional layer by changing an arrangement manner of parameters of the fully connected layer.

S504: Replace the regression layer in the convolutional neural network for classification with a regression layer configured to map the second feature output by the converted convolutional layer to the human head position and the corresponding confidence level.

In the conventional convolutional neural network for classification, the regression layer is configured to map the second features of each preset type output by the fully connected layer to a probability corresponding to each preset type, and determine, according to the mapped probability, a preset type to which the image belongs. For example, a preset type corresponding to a maximum probability is selected as the preset type to which the input image belongs.

In the convolutional neural network for human head detection of this disclosure, the regression layer is configured to map a preset number of second features output by the converted convolutional layer to the human head positions and the confidence levels corresponding to the human head positions. The regression layer may use a convolutional layer. The convolutional layer directly maps the second features to the human head positions and the confidence levels corresponding to the human head positions. The regression layer may also use two convolutional layers in parallel. One convolutional layer is configured to map the second features to the human head positions, and the other convolutional layer is configured to map the second features to the confidence levels corresponding to the mapped human head positions.

S506: Train the convolutional neural network including the preprocessing layer, the converted convolutional layer, and the replaced regression layer by using the training images having the marked human head positions.

The convolutional neural network including the preprocessing layer, the converted convolutional layer and the replaced regression layer is reconstructed and modified from the conventional convolutional neural network for classification applications. In one implementation, parameters of the preprocessing layer may be pre-trained. Then for the reconstructed convolutional neural network, mainly the parameters in the converted convolutional layer and the replaced regression layer need to be trained. The training processing may be joint process. For example, the entire network may be trained. The preprocessing layer training parameters may be initialized to its pre-trained parameters and retrained together with the rest of network.

Specifically, when the reconstructed convolutional neural network is trained, the confidence level may be pre-assigned to the marked human head positions of the training image. The training image is segmented into one or more sub-images according to the same segmenting manner as that of the image to be detected. The segmented sub-images are respectively input to the convolutional neural network, and the human head positions and the confidence levels are output by the preprocessing layer, the convolutional layer after the preprocessing layer, and the regression layer of the convolutional neural network. The difference between the output human head positions and the marked human head position is calculated, and the difference between the corresponding confidence levels is calculated, and the parameters in the preprocessing layer, the convolutional layer after the preprocessing layer, and the regression layer in the convolutional neural network are adjusted according to the two differences. The training is continued until a termination condition is reached. The termination condition may be that the difference is less than a preset difference, or the number of iterations reaches a preset number of times.

In this embodiment, the training is performed after reconstruction of conventional neural network for classification into a the convolutional neural network for human head detection. The reconstruction does not require complete redesign of the neural network, training duration can be reduced and efficiency of human head detection is improved.

Figure 6:
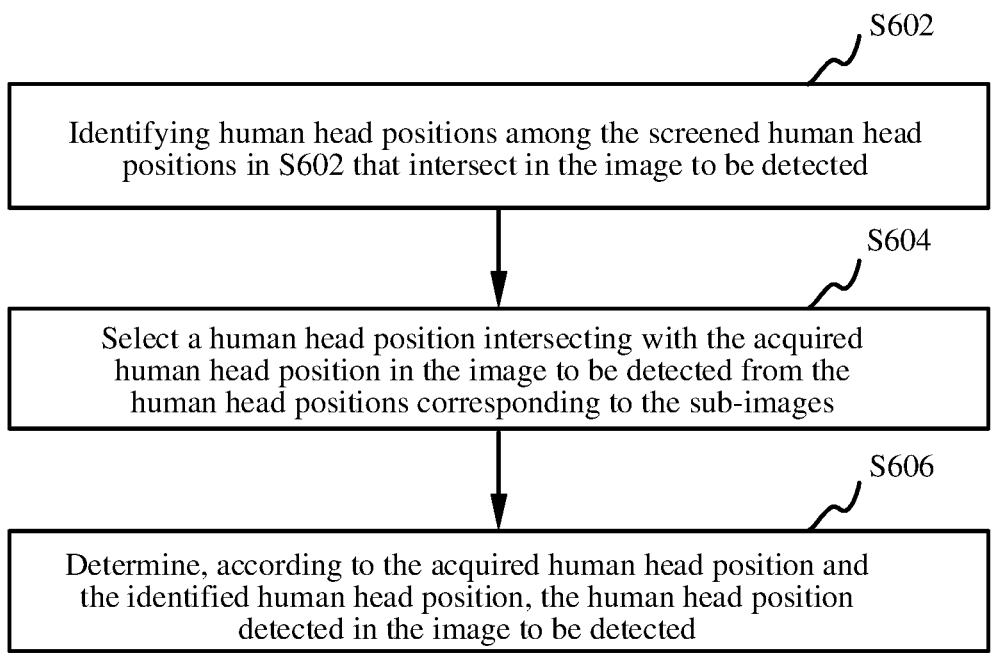
FIG. 6 is a schematic flowchart for filtering human head positions according to confidence levels.

As shown in FIG. 6, in an embodiment, step S310 specifically includes the following steps:

S602: Screen, from the human head positions corresponding to the sub-images, to acquire a human head position corresponding to a confidence level greater than or equal to a confidence level threshold.

Specifically, the electronic device may form the human head positions respectively corresponding to the sub-images segmented from the image to be detected into a human head position set, traverse the human head position set, and compare confidence levels the traversed human head positions with the confidence level threshold. The human head positions having confidence levels lower than the confidence level threshold may be removed from the human head position set. The remaining human head positions in the human head position set after the traversing are the acquired human head positions of which the corresponding confidence levels are greater than or equal to the confidence level threshold. The confidence level threshold may be set as needed, for example, may be valued from 0.5 to 0.99.

S604: Selecting or identifying human head positions among the screened human head positions in S602 that intersect in the image to be detected.

The intersection of the human head positions means that enclosed areas indicated by respective human head positions have an intersection in the image to be detected. When the human head position is represented by a position of a rectangular box including the human head image, the intersection of the human head positions is the intersection of the corresponding rectangular boxes. Specifically, the electronic device may select a human head position intersecting with the acquired human head position in the image to be detected from the human head position set formed by the human head positions respectively corresponding to all the sub-images segmented from the image to be detected. The electronic device may also seek for the intersecting human head positions from only the acquired human head positions.

S606: Determine, according to the acquired human head position and the identified human head position, the human head position detected in the image to be detected.

Specifically, the electronic device may classify the acquired human head positions and the selected human head positions. Each type includes at least one of the acquired human head positions, and also includes human head positions intersecting with the at least one human head position. The electronic device may combine the human head positions of each type to one human head position as a detected head position, or select one human head position from the human head positions of each type as the detected human head position.

In this embodiment, the accuracy of human head detection can be further improved by using the confidence levels and the position intersection the basis for determining the human head position in the image to be detected.

Figure 7:
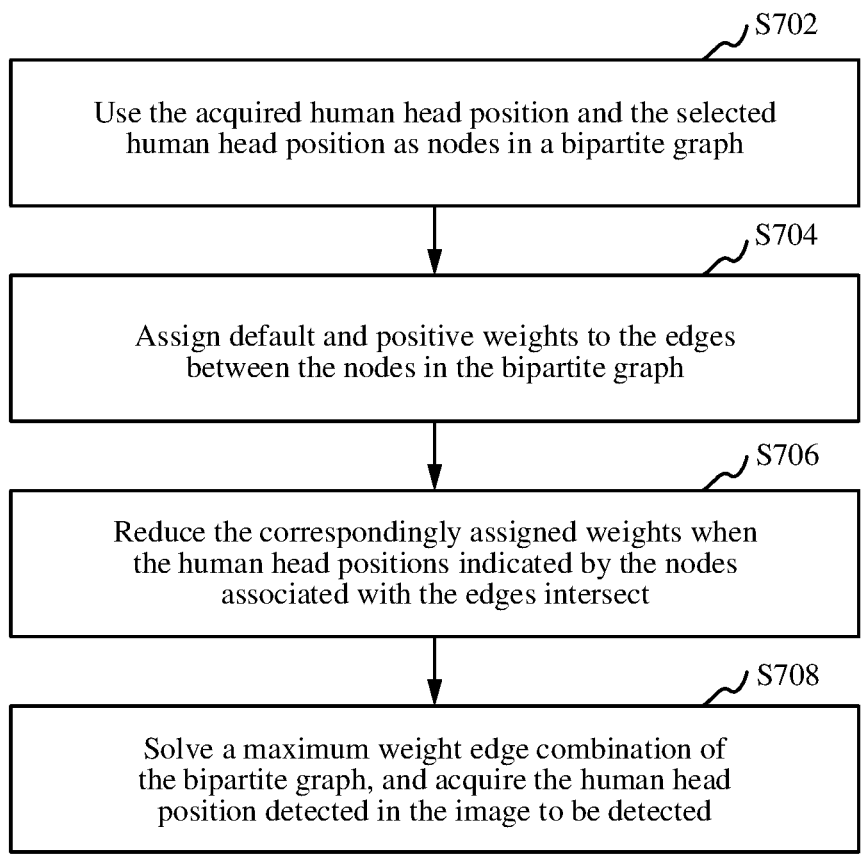
FIG. 7 is a schematic flowchart for implementing step 606 of FIG. 6.

As shown in FIG. 7, in an embodiment, step S606 specifically includes the following steps:

S702: Use the acquired human head position (from step 602) and the selected human head position (from step 604) as nodes in a bipartite graph, as a first group and second group, respectively.

The bipartite graph is a graph in the graph theory, the nodes in the bipartite graph may be segmented into two groups, and all edges connected to the nodes are caused to span boundaries of the groups.

S704: Assign default and positive weights to the edges between the nodes in the bipartite graph.

There is an edge between each acquired human head position and the correspondingly selected intersecting human head position. The default and positive weight is a positive value, such as 1000.

S706: Reduce the correspondingly assigned weights for the corresponding edges that are associated with nodes representing intersecting head positions.

Specifically, when the human head positions indicated by the nodes associated with the edges intersect, the electronic device may subtract a positive value less than the default and positive weight from the correspondingly assigned weight, and then divide the subtracted value by the default and positive weight to acquire an updated weight. If the default and positive weight is 1000, and the positive value less than the default and positive weight is 100, then the updated weight is (1000−100)/1000=0.9.

S708: Solve a maximum weight edge combination of the bipartite graph, and acquire the human head position detected in the image to be detected.

An edge combination in the bipartite graph is a set of edges have no common nodes. If a particular weight sum of edges of one of all the edge combinations of one bipartite graph is largest, this particular edge combination is referred to as the maximum weight edge combination. The electronic device may traverse all edge combinations in the bipartite graph to find the maximum weight edge combination. The electronic device may also use a Kuhn-Munkres algorithm to solve the maximum weight edge combination of the bipartite graph. After the maximum weight edge combination is solved, the human head positions associated with the edges in the maximum weight edge combination can be used as the human head position detected in the image to be detected.

In this embodiment, since the intersecting human head positions may correspond to the same human head, the human head positions output by the convolutional neural network are mostly gathered near the actual human head position in the image to be detected. Therefore, the acquired human head positions (step 602, for example) and the selected human head positions (step 605, for example) are used as the nodes in the bipartite graph to construct the bipartite graph, and weights of the corresponding edges of the intersecting human head positions are reduced. By solving the maximum weight edge combination, the detected human head position in the image to be detected are acquired, and the human head detection can be performed more accurately.

Figure 8:
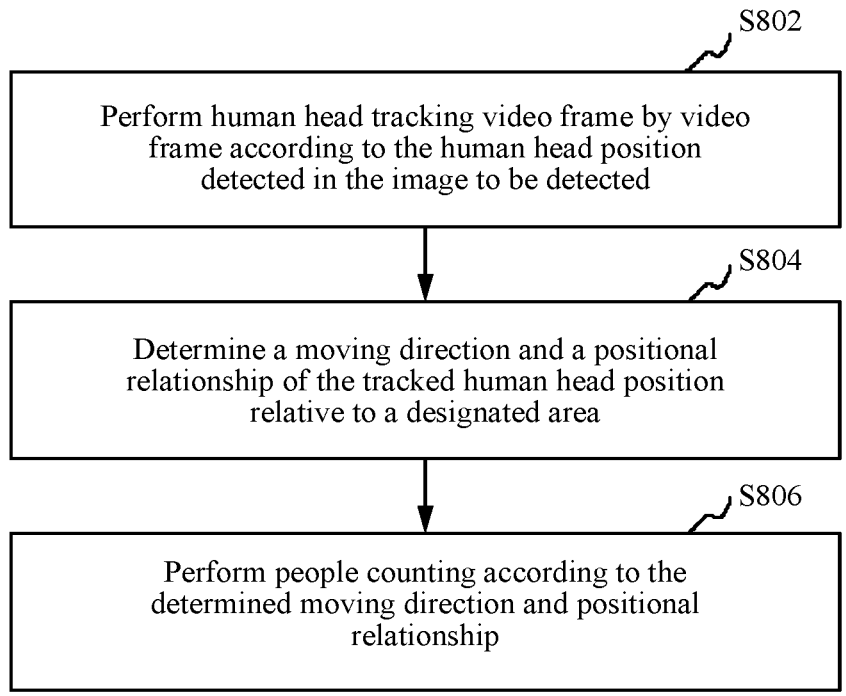
FIG. 8 is a schematic flowchart of performing human head tracking and performing people counting according in a video frame by frame.

In an embodiment, the image to be detected may be a video frame in a video, and the human head detection method further includes a step of performing human head tracking and performing people counting frame by frame. Referring to FIG. 8, the step of performing human head tracking and performing people counting frame by frame specifically includes the following steps:

S802: Perform human head tracking video according to the human head position detected in the image frame to be detected frame by video frame.

Specifically, after detecting the human head position in one video frame, the electronic device performs the human head tracking video frame by video frame by using the detected human head position as a starting point. The electronic device may specifically use a mean shift (average drift) tracking algorithm, an optical flow tracking algorithm, or a tracking-learning-detection (TLD) algorithm.

S804: Determine a moving direction and a positional relationship of the tracked human head position relative to a designated area.

The designated area refers to the area designated in the video frame. The moving direction of the tracked human head position relative to the designated area refers to that the human head position is, for example, moving toward or away from the designated area. The positional relationship of the tracked human head position relative to the designated area refers to that the human head position is inside or outside the designated area.

In an embodiment, when the tracked human head position crosses a line representing a boundary of the designated area in a direction toward the designated area, it is determined that the tracked human head position enters the designated area. When the tracked human head position crosses the line representing the boundary of the designated area in a direction away from the designated area, it is determined that the tracked human head position leaves the designated area.

In an embodiment, when the tracked human head position sequentially crosses a first line and a second line parallel with the first line, it is determined that the tracked human head position enters the designated area. When the tracked human head position sequentially crosses the second line and the first line, it is determined that the tracked human head position leaves the designated area.

The parallel first line and second line may be straight lines or curved lines. The designated area may be one of two areas formed by segmenting the image to be detected by the second line, without including the first line. In this embodiment, the moving direction and the positional relationship of the tracked human head position relative to the designated area are determined by the two lines, thereby preventing a judgment error caused by movement of the human head position in the vicinity of the boundary of the designated area, thereby ensuring the correctness of people counting.

S806: Perform people counting according to the determined moving direction and positional relationship.

The people counting may be specifically counting a combination of one or more of the number of accumulated people entering the designated area, the number of accumulated people leaving the designated area, and the dynamic number of people entering the designated area. Specifically, the electronic device may add 1 to the number of statistically accumulated people entering the designated area, and/or add 1 to the number of dynamic people entering the designated area when one tracked human head position enters the designated area. The electronic device may add 1 to the number of statistically accumulated people leaving the designated area, and/or subtract 1 from the number of dynamic people entering the designated area when one tracked human head position leaves the designated area In this embodiment, the human head detection may applied to security application. The people counting is performed according to the moving direction and the positional relationship of the tracked human head position relative to the designated area. Based on accurate human head detection, the accuracy of people counting can be improved.

Figure 9:
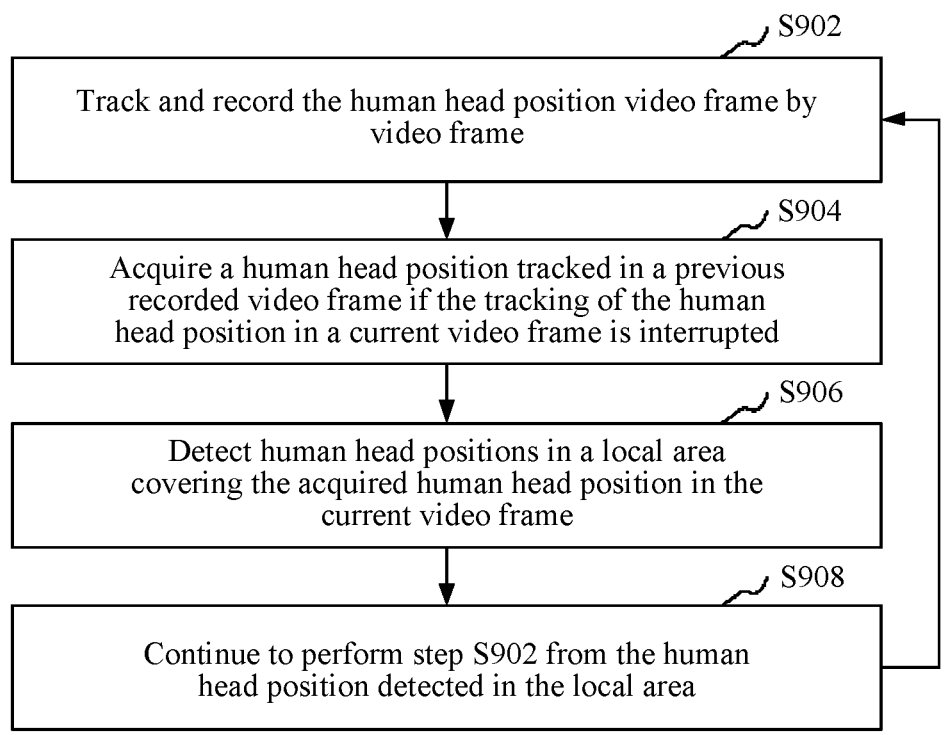
FIG. 9 is a schematic flowchart for detecting a human head position in a current video image frame near a human head position tracked in a previous video frame and continuing to track the human head when the tracking of a human head position is interrupted at the previous video frame.

In an embodiment, the human head detection method further includes a step of detecting the human head position and continuing tracking near the human head position tracked in a previous video frame when the tracking of the human head position is interrupted. Referring to FIG. 9, the step specifically includes the following steps:

S902: Track and record the human head position video frame by video frame.

Specifically, the electronic device tracks the detected human head position with the detected human head position in the image to be detected as a starting point, and records the tracked human head position.

S904: Acquire a human head position tracked in a previous recorded video frame if the tracking of the human head position in a current video frame is interrupted.

Specifically, when a character moves quickly or lighting changes, the tracking of the human head position may be interrupted, and in this case, the human head position tracked in the previous video frame and recorded during the tracking video frame by video frame is acquired.

S906: Detect human head positions in a local area covering the acquired human head position (in step 904) in the current video frame.

The local area covering the acquired human head position is smaller than a size of one video frame, and larger than a size of the area occupied by the human head position tracked in the previous video frame. A shape of the local area may be similar to a shape of the area occupied by the human head position tracked in the previous video frame. A center of the local area may overlap with a center of the area occupied by the human head position tracked in the previous video frame.

Specifically, the electronic device may detect the human head positions in the current video frame to find the human head positions belonging to the local area. The electronic device may also detect the human head positions only in the local area. The electronic device may specifically use the steps of steps S302 to S310 to detect the human head positions in the local area in the current video frame. The detected human head positions may be partially or entirely located in the local area. The electronic device may use the human head positions of which the centers are within the local area as the human head positions in the detected local area, and the human head positions of which the centers are outside the local area do not belong to the human head positions in the local area.

For example, when the human head position is represented by a position of a rectangular box including the human head image, if a width of the rectangular box tracked in the previous video frame is W and a height is H, a and b are set to coefficients greater than 1, then the local area may be the rectangular area having a width of a*W and a height of b*H and the same center as the rectangular box. If the center coordinates of the rectangular box tracked in the previous video frame are (X1, X2) and the center coordinates of another rectangular box indicating the human head position are (X2, Y2), then when |X1−X2|<W/2 and |Y1−Y2|<H/2, the rectangular box of which the center coordinates are (X2, Y2) is determined to be in the local area of the rectangular box of which the center coordinates are (X1, X2).

S908: Continue to perform step S902 from the human head position detected in the local area.

In this embodiment, when the tracking of the human head positions is interrupted, the human head positions can be detected from the vicinity of the human head positions detected in the previous frame, and the interrupted human head tracking can be recovered from the interruption and continued. The human head detection and the human head tracking are combined to ensure the continuity of the tracking. Further, the accuracy of people counting is ensured.

Figure 10:
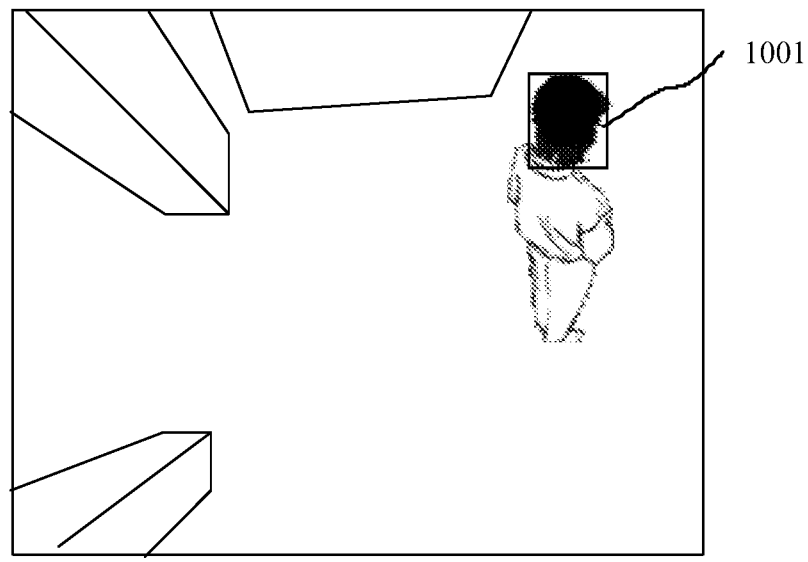
FIG. 10 illustrates an application scenario for human head detection and tracking.

The specific principle of the foregoing human head detection method is described below with a specific application scenario. A large number of top view images at an elevator entrance scene are acquired in advance, and the human head positions in these top view images are marked or labeled. For example, a quadruple is used to indicate the position of the human head image in a rectangular box 1001 in FIG. 10. A convolutional neural network for classification is selected, the fully connected layer after the preprocessing layer and before the regression layer is converted to a convolutional layer, and the regression layer therein is replaced with the regression layer configured to map the second feature output by the converted convolutional layer to the human head position and the corresponding confidence level, thereby retraining the convolutional neural network by using the marked top view image.

Figure 11:
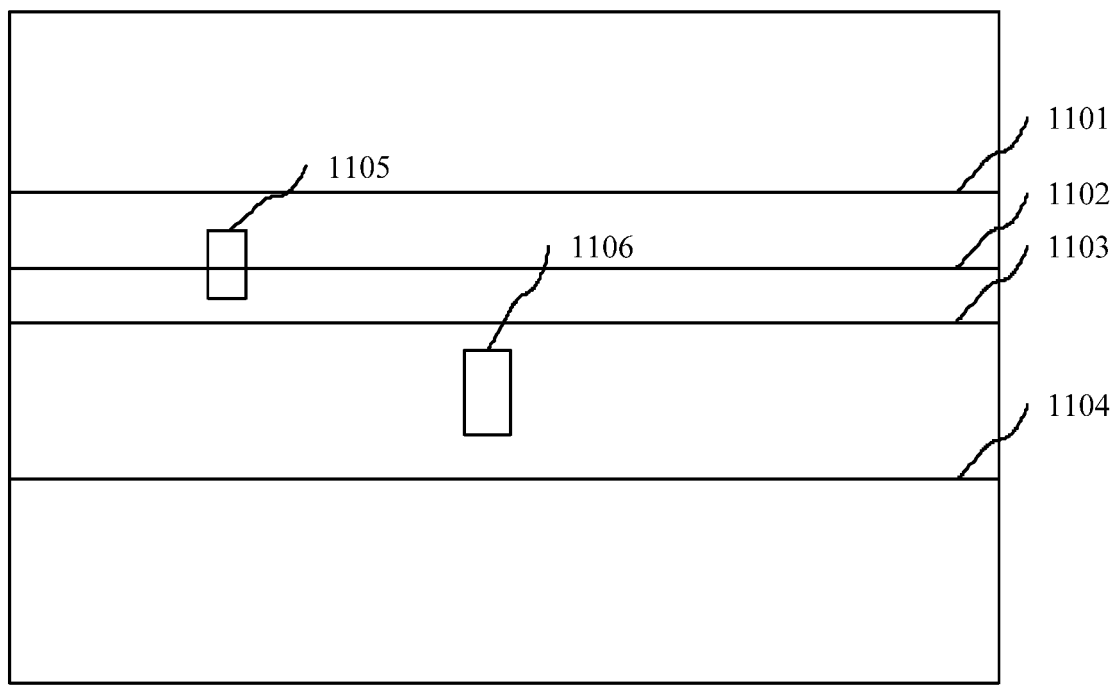
FIG. 11 is a schematic diagram of performing people counting by using two parallel lines according to an embodiment.

Referring to FIG. 11, in actual application, if the number of people entering and exiting a gate needs to be counted, a top view camera is disposed above a gate, and the videos are captured by the top view camera and transmitted to an electronic device connected to the top view camera. The electronic device uses an image area sandwiched by a line 1101 and a line 1104 in one of the video frames as an image to be detected, and segments the image to be detected into one or more sub-images. Each sub-image is input to a convolutional neural network trained by training images having a marked human head positions. The convolutional neural network outputs the human head positions corresponding to each sub-image and the confidence level corresponding to the human head positions, thereby filtering, according to the corresponding confidence level, the human head positions corresponding to each sub-image, and acquiring the human head positions detected in the image to be detected.

Further, the electronic device performs human head tracking video frame by video frame according to the human head position detected in the image to be detected, and it is determined that a tracked human head position 1105 enters a designated area when the tracked human head position 1105 sequentially crosses a first line 1102 and a second line 1103 parallel with the first line 1102. When a tracked human head position 1106 sequentially crosses the second line 1103 and the first line 1102, it is determined that the tracked human head position 1106 leaves the designated area. The designated area in FIG. 11 may be specifically the area sandwiched by the second line 1103 and a line 1104.

In an embodiment, an electronic device is further provided, and an internal structure of the electronic device may be shown in FIG. 2. The electronic device includes a human head detection apparatus. The human head detection apparatus includes various modules, and the modules may be all or partially implemented by software, hardware or a combination thereof.

Figure 12:
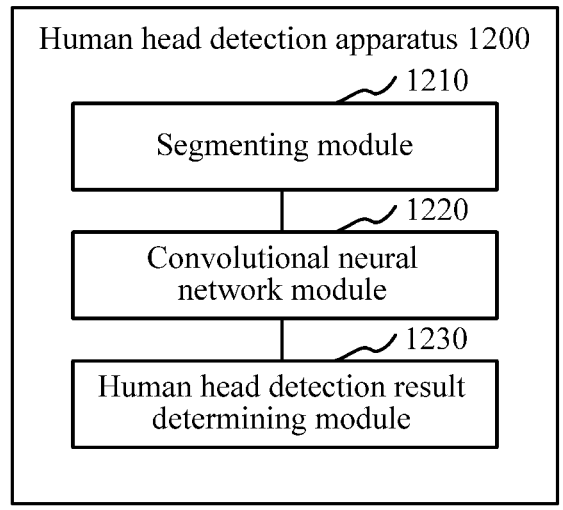
FIG. 12 is a structural block diagram of a human head detection apparatus according to an embodiment.

FIG. 12 is a structural block diagram of a human head detection apparatus 1200 according to an embodiment. Referring to FIG. 12, the human head detection apparatus 1200 includes a segmenting module 1210, a convolutional neural network module 1220, and a human head detection result determining module 1230.

The segmenting module 1210 is configured to segment an image to be detected into one or more sub-images.

The convolutional neural network module 1220 is configured to segment the image to be detected into one or more sub-images; input each sub-image to a convolutional neural network trained according to training images having marked human head positions, and output, by a preprocessing layer including at least one convolutional layer and at least one pooling layer in the convolutional neural network, a first feature corresponding to each sub-image; map, through the convolutional layer after the preprocessing layer in the convolutional neural network, the first feature corresponding to each sub-image to a second feature corresponding to each sub-image; and map, through a regression layer of the convolutional neural network, the second feature corresponding to each sub-image to a human head position corresponding to each sub-image and a corresponding confidence level of the human head position.

The human head detection result determining module 1230 is configured to filter, according to the corresponding confidence level, the human head position corresponding to each sub-image, to acquire a human head position detected in the image to be detected.

According to the human head detection apparatus 1200, the convolutional neural network is trained in advance based on the training image having the marked human head position, and the convolutional neural network can automatically learn human head features. The trained convolutional neural network can automatically extract appropriate features from the sub-images to output candidate human head positions and corresponding confidence levels, and then filter, according to the confidence levels, to acquire the human head position in the image to be detected. The human head shape is not required to be assumed in advance, a missed detection caused by setting the human head shape can be avoided, and accuracy of the human head detection is improved. Moreover, in the convolutional neural network, the first features of the sub-images are output by the preprocessing layer including the convolutional layer and the pooling layer, and the second features are outputted by the convolutional layer after the preprocessing layer and before the regression layer to accurately describe human head features in the sub-images. Therefore, the second features are directly mapped to the human head positions and confidence levels by the regression layer, which is new application of the convolutional neural network of the new structure. Compared with the traditional circle detection, the accuracy of the human head detection is greatly improved.

In an embodiment, the segmenting module 1210 is further configured to segment the image to be detected into one or more sub-images of a fixed size, and adjacent sub-images in the segmented sub-images have an overlapping part. In this embodiment, there is an overlapping part between the adjacent segmented sub-images, thereby ensuring that the adjacent sub-images have stronger correlation, and improving accuracy of detecting a human head position from the image to be detected.

Figure 13:
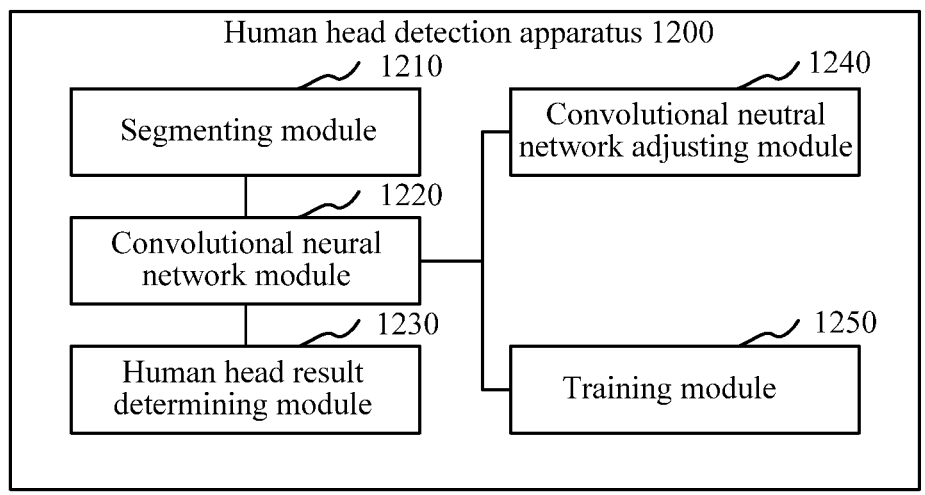
FIG. 13 is a structural block diagram of a human head detection apparatus according to another embodiment.

As shown in FIG. 13, in an embodiment, the human head detection apparatus 1200 further includes a convolutional neural network adjusting module 1240 and a training module 1250.

The convolutional neural network adjusting module 1240 is configured to convert a fully connected layer after the preprocessing layer and before the regression layer included in the convolutional neural network for classification to a convolutional layer; and replace a regression layer in the convolutional neural network for classification with a regression layer configured to map the second feature output by the converted convolutional layer to the human head position and the corresponding confidence level.

The training module 1250 is configured to train the convolutional neural network including the preprocessing layer, the converted convolutional layer and the replaced regression layer by using the training image having the marked human head position.

In this embodiment, the training after reconstruction is performed based on the convolutional neural network for classification, to acquire the convolutional neural network for human head detection. The reconstruction of the convolutional neural network is not required, the training duration can be reduced and the efficiency of human head detection is improved.

In an embodiment, the convolutional neural network module 1220 is further configured to map, through a first convolutional layer in the regression layer in the convolutional neural network, the second feature corresponding to each sub-image to a human head position corresponding to each sub-image; and map, through a second convolutional layer in the regression layer in the convolutional neural network, the second feature corresponding to each sub-image to a confidence level corresponding to the output human head position.

Figure 14:
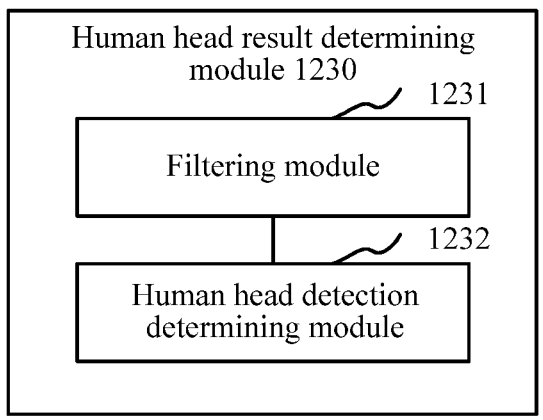
FIG. 14 is a structural block diagram of a human head detection result determining module according to an embodiment.

As shown in FIG. 14, in an embodiment, the human head detection result determining module 1230 includes a filtering module 1231 and a head position determining module 1232.

The filtering module 1231 is configured to screen, from the human head positions corresponding to the sub-images, to acquire a human head position corresponding to a confidence level greater than or equal to a confidence level threshold; and select a human head position intersecting with the acquired human head position in the image to be detected from the human head positions corresponding to the sub-images.

The human head position determining module 1232 is configured to determine, according to the acquired human head position and the selected human head position, the human head position detected in the image to be detected.

In this embodiment, the accuracy of the human head detection can be further improved by using the confidence levels and the intersection or not as the basis for determining the human head position in the image to be detected.

In an embodiment, the human head position determining module 1232 is further configured to use the acquired human head position and the selected human head position as nodes in a bipartite graph; assign default and positive weights to edges between the nodes in the bipartite graph; reduce the corresponding assigned weights when the human head positions indicated by the nodes associated with the edges intersect; and solve a maximum weight edge combination of the bipartite graph, to acquire the head position detected in the image to be detected.

In this embodiment, since the intersecting human head position are likely to correspond to the same human head, the human head positions output by the convolutional neural network are mostly gathered near the actual human head position in the image to be detected. Therefore, the acquired human head positions and the selected human head positions are used as nodes in the bipartite graph to construct the bipartite graph, and weights of the corresponding edges of the intersecting human head positions are relatively small. By solving the maximum weight edge combination, the human head position detected in the image to be detected are acquired, and the human head detection can be performed more accurately.

Figure 15:
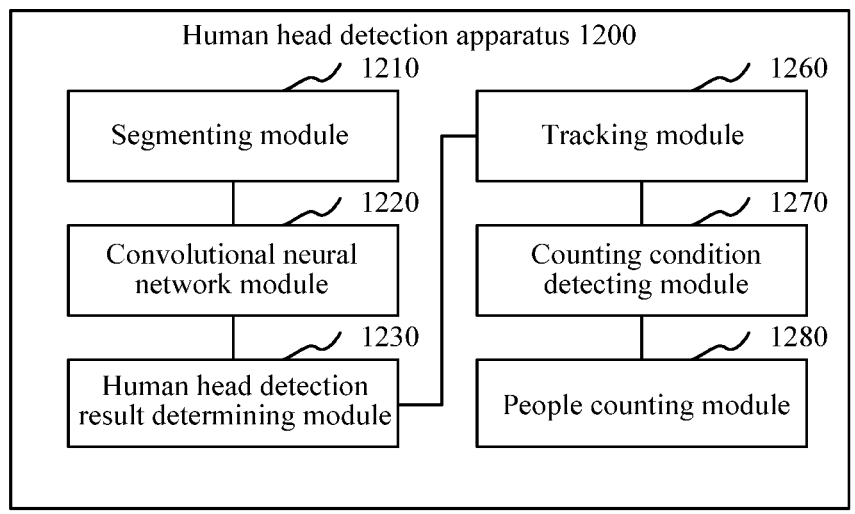
FIG. 15 is a structural block diagram of a human head detection apparatus according to still another embodiment.

As shown in FIG. 15, in an embodiment, the image to be detected is a video frame in a video. The human head detection apparatus 1200 further includes:

a tracking module 1260, configured to perform head tracking video frame by video frame according to the human head position detected in the image to be detected;

a counting condition detecting module 1270, configured to determine a moving direction and a positional relationship of the tracked human head position relative to the designated area; and a people counting module 1280, configured to perform people counting based on the determined moving direction and positional relationship.

In this embodiment, the human head detection is applied to the field of security. The people counting is performed according to the moving direction and the positional relationship of the tracked human head position relative to the designated area. Based on accurate human head detection, the accuracy of people counting can be ensured.

In an embodiment, the counting condition detecting module 1270 is further configured to: determine that the tracked human head position enters the designated area when the tracked human head position sequentially spans a first line and a second line parallel with the first line; and determine that the tracked human head position leaves the designated area when the tracked human head position sequentially span the second line and the first line.

In this embodiment, the moving direction and the positional relationship of the tracked human head position relative to the designated area are determined by two lines, thereby preventing a judgment error caused by the moving of the human head position near a boundary of the designated area, thereby ensuring the correctness of people counting.

Figure 16:
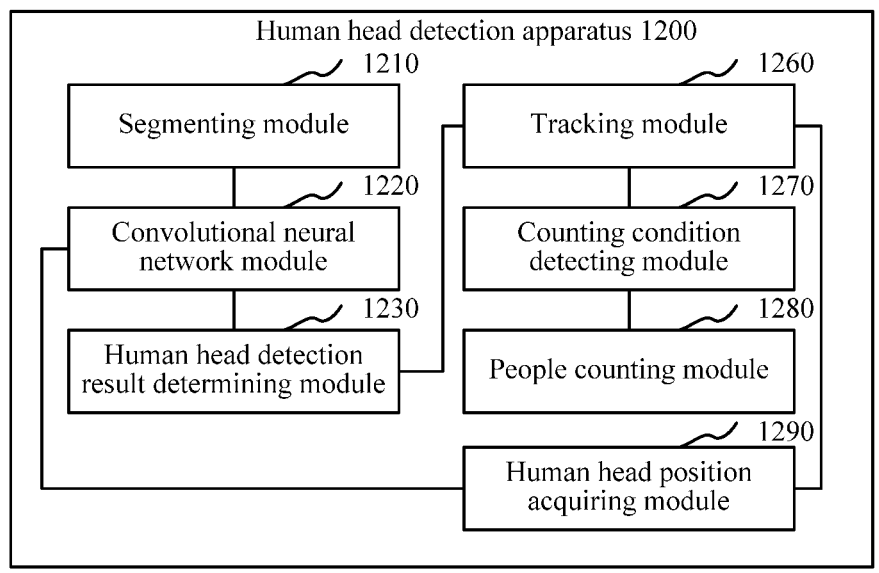
FIG. 16 is a structural block diagram of a human head detection apparatus according to yet another embodiment.

As shown in FIG. 16, in an embodiment, the human head detecting module 1200 further includes a human head position acquiring module 1290.

The tracking module 1260 is further configured to track and record the human head position video frame by video frame.

The human head position acquiring module 1290 is configured to acquire a human head position tracked in a previous recorded video frame if the tracking of the human head position in a current video frame is interrupted.

The convolutional neural network module 1220 is further configured to detect human head positions in a local area covering the acquired head position in the current video frame.

The tracking module 1260 is further configured to continue to perform the step of tracking and recording the human head position video frame by video frame from the human head positions detected in the local area.

In this embodiment, when the tracking of the human head positions is interrupted, the human head positions can be detected from the vicinity of the human head positions detected in the previous frame, and the interrupted human head tracking can be continued. The human head detection and the human head tracking are combined to ensure the continuity of the tracking. Further, the accuracy of people counting is ensured.

It should be understood that the steps in various embodiments of this application are not necessarily performed in an order indicated by the step numbers. Unless explicitly described in this specification, there is no strict sequence for execution of the steps. In addition, at least some steps in the embodiments may include a plurality of substeps or a plurality of stages. The substeps or the stages are not necessarily performed at a same moment, and instead may be performed at different moments. A performing sequence of the substeps or the stages is not necessarily performing in sequence, and instead may be performed in turn or alternately with another step or at least some of substeps or stages of the another step.

A person of ordinary skill in the art may understand that all or some of the processes of the methods in the foregoing embodiments may be implemented by a computer program instructing relevant hardware. The program may be stored in a non-volatile computer-readable storage medium. When the program runs, the processes of the foregoing methods in the embodiments are performed. The memory, storage, database or any other media in the embodiments provided in this application may include a non-volatile and/or volatile memory. The non-volatile memory may include: a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration and not limitation, the RAM may be implemented in various forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

Various technical features in the foregoing embodiments may be randomly combined. For ease of description, not all possible combinations of the various technical features in the foregoing embodiments are described. However, the combinations of the technical features should be considered as falling within the scope recorded in this specification as long as the combinations of the technical features are compatible with each other.

The foregoing embodiments only describe several implementations of this application, which are described specifically and in detail, and therefore cannot be construed as a limitation to the patent scope of the present disclosure. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A method for detecting human head in an image performed by an electronic device comprising a processor, the method comprising:

segmenting, by the electronic device, the image into one or more sub-images;

inputting, by the electronic device, each sub-image to a convolutional neural network trained according to training images having marked human head positions, and outputting, by a preprocessing layer of the convolutional neural network comprising a first convolutional layer and a pooling layer, a first feature corresponding to each sub-image;

mapping, by the electronic device through a second convolutional layer after the preprocessing layer in the convolutional neural network, the first feature corresponding to each sub-image to a second feature corresponding to each sub-image;

mapping, by the electronic device through a regression layer in the convolutional neural network, the second feature corresponding to each sub-image to a human head position corresponding to each sub-image and a corresponding confidence level of the human head position; and filtering, by the electronic device according to the corresponding confidence level, human head positions corresponding to the one or more sub-images, to acquire detected human head positions in the image.

2. The method according to claim 1, wherein segmenting, by an electronic device, the image to be detected into one or more sub-images comprises:

segmenting, by the electronic device, the image into one or more sub-images of a fixed size, wherein adjacent sub-images in the one or more sub-images partially overlap.

3. The method according to claim 1, wherein:

a fully connected layer in a conventional convolution neural network is converted to the second convolutional layer;

a conventional regression layer in a conventional convolutional neural network for image classification is replaced by the regression layer for mapping the second feature output by the second convolutional layer to the human head position and the corresponding confidence level; and the method further comprises training, by the electronic device, the convolutional neural network comprising the preprocessing layer, the second convolutional layer, and the regression layer by using the training images having the marked human head positions.

4. The method according to claim 1, wherein mapping, by the electronic device through the regression layer in the convolutional neural network, the second feature corresponding to each sub-image to a human head position corresponding to each sub-image and a corresponding confidence level of the human head position comprises:

mapping, by the electronic device through a third convolutional layer in the regression layer of the convolutional neural network, the second feature corresponding to each sub-image to the human head position corresponding to each sub-image; and mapping, by the electronic device through a fourth convolutional layer in the regression layer of the convolutional neural network, the second feature corresponding to each sub-image to the confidence level corresponding to the human head position.

5. The method according to claim 1, wherein filtering, by the electronic device according to the corresponding confidence level, the human head positions corresponding to the one or more sub-images, to acquire the detected human head positions in the image comprises:

screening, by the electronic device from the human head positions corresponding to the one or more sub-images, to acquire screened human head positions corresponding to confidence levels greater than or equal to a predetermined confidence level threshold;

selecting, by the electronic device, human head positions intersecting with the screened human head positions from the screened human head positions to obtain overlapped human head positions; and determining, by the electronic device according to the screened human head positions and the overlapped human head positions, the detected human head positions of the image.

6. The method according to claim 5, wherein determining, by the electronic device according to the screened human head positions and the overlapped human head positions, the detected human head positions of the image comprises:

using, by the electronic device, the screened human head positions and the overlapped human head positions as nodes in a bipartite graph;

assigning, by the electronic device, default and positive weights to edges between the nodes in the bipartite graph;

reducing, by the electronic device, weights of edges in the bipartite graph associated with the overlapped human head positions; and solving, by the electronic device, a maximum weight edge combination of the bipartite graph to obtain the detected human head positions of the image.

7. The method according to claim 1, wherein the image comprises a video frame in a video, and the method further comprises:

performing, by the electronic device, human head tracking according to the detected human head positions video frame by video frame;

determining, by the electronic device, a moving direction and a positional relationship of each of the tracked human head positions relative to a designated area; and performing, by the electronic device, people counting according to the moving direction and positional relationship of each of the tracked human head positions.

8. The method according to claim 7, wherein determining, by the electronic device, the moving direction and the positional relationship of the tracked human head position relative to the designated area comprises:

determining, by the electronic device, that the tracked human head position enters the designated area when the tracked human head position sequentially crosses a first line and a second line parallel with the first line; and determining, by the electronic device, that the tracked human head position leaves the designated area when the tracked human head position sequentially crosses the second line and the first line.

9. The method according to claim 7, wherein the method further comprises:

tracking and recording, by the electronic device, the detected human head positions video frame by video frame;

acquiring, by the electronic device, a human head position tracked in a previous video frame if the tracking of the human head position in a current video frame is interrupted;

detecting, by the electronic device, a recovered human head position in the current video frame within a local area covering the acquired human head position in the previous video frame; and continuing, by the electronic device, tracking and recording the recovered human head position video frame by video frame.

10. An electronic device for detecting human head in an image, comprising a memory and a processor, the memory storing computer readable instructions, the computer readable instructions, when executed by the processor, causing the processor to perform the following steps:

segmenting the image into one or more sub-images;

inputting each sub-image to a convolutional neural network trained according to training images having marked human head positions, and outputting, by a preprocessing layer of the convolutional neural network comprising a first convolutional layer and a pooling layer, a first feature corresponding to each sub-image;

mapping, through a second convolutional layer after the preprocessing layer in the convolutional neural network, the first feature corresponding to each sub-image to a second feature corresponding to each sub-image;

mapping, through a regression layer in the convolutional neural network, the second feature corresponding to each sub-image to a human head position corresponding to each sub-image and a corresponding confidence level of the human head position; and filtering, according to the corresponding confidence level, human head positions corresponding to the one or more sub-images, to acquire detected human head positions in the image.

11. The electronic device according to claim 10, wherein segmenting, by an electronic device, the image into one or more sub-images comprises:

segmenting the image into one or more sub-images of a fixed size, wherein adjacent sub-images in the one or more sub-images partially overlap.

12. The electronic device according to claim 10, wherein:

a fully connected layer in a conventional convolution neural network is converted to the second convolutional layer;

a conventional regression layer in a conventional convolutional neural network for image classification is replaced by the regression layer for mapping the second feature output by the second convolutional layer to the human head position and the corresponding confidence level; and the computer readable instructions causes the processor to further perform the step of training, by the electronic device, the convolutional neural network comprising the preprocessing layer, the second convolutional layer, and the regression layer by using the training images having the marked human head positions.

13. The electronic device according to claim 10, wherein mapping, through a regression layer in the convolutional neural network, the second feature corresponding to each sub-image to a human head position corresponding to each sub-image and a corresponding confidence level of the human head position comprises:

mapping, through a third convolutional layer in the regression layer of the convolutional neural network, the second feature corresponding to each sub-image to the human head position corresponding to each sub-image; and mapping, through a fourth convolutional layer in the regression layer of the convolutional neural network, the second feature corresponding to each sub-image to the confidence level corresponding to the human head position.

14. The electronic device according to claim 10, wherein filtering, according to the corresponding confidence level, the human head position corresponding to the one or more sub-images, to acquire the detected human head positions in the image to be detected comprises:

screening, from the human head positions corresponding to the one or more sub-images, to acquire screened human head positions corresponding to confidence levels greater than or equal to a predetermined confidence level threshold;

selecting human head positions intersecting with the screened human head positions from the screened human head positions to obtain overlapped human head positions; and determining, according to the screened human head positions and the overlapped human head positions, the detected human head positions.

15. The electronic device according to claim 14, wherein determining, according to the screened human head positions and the overlapped human head positions, the detected human head positions in the image comprises:

using the screened human head positions and the overlapped human head positions as nodes in a bipartite graph;

assigning default and positive weights to edges between the nodes in the bipartite graph;

reducing weights of edges in the bipartite graph associated with the overlapped human head positions; and solving a maximum weight edge combination of the bipartite graph to obtain the detected human head positions in the image.

16. The electronic device according to claim 10, wherein the image comprises a video frame in a video; and the computer readable instructions further causes the processor to perform the following steps:

performing human head tracking according to the detected human head positions video frame by video frame;

determining a moving direction and a positional relationship of each of the tracked human head positions relative to a designated area; and performing people counting according to the moving direction and positional relationship of each of the tracked human head positions.

17. The electronic device according to claim 16, wherein determining the moving direction and the positional relationship of the tracked human head position relative to the designated area comprises:

determining that the tracked human head position enters the designated area when the tracked human head position sequentially crosses a first line and a second line parallel with the first line; and determining that the tracked human head position leaves the designated area when the tracked human head position sequentially crosses the second line and the first line.

18. The electronic device according to claim 16, wherein the computer readable instructions further causes the processor to perform the following steps:

tracking and recording the detected human head positions video frame by video frame;

acquiring a human head position tracked in a previous video frame if the tracking of the human head position in a current video frame is interrupted;

detecting a recovered human head position in the current video frame within a local area covering the acquired human head position in the previous video frame; and continuing tracking and recording the recovered human head position video frame by video frame.

19. A non-volatile storage medium for storing computer readable instructions, the computer readable instructions, when executed by one or more processors, causing the one or more processors to perform human head detection in an image by the following steps:

segmenting the image into one or more sub-images;

inputting each sub-image to a convolutional neural network trained according to training images having marked human head positions, and outputting, by a preprocessing layer of the convolutional neural network comprising a first convolutional layer and a pooling layer, a first feature corresponding to each sub-image;

mapping, through a second convolutional layer after the preprocessing layer in the convolutional neural network, the first feature corresponding to each sub-image to a second feature corresponding to each sub-image;

mapping, through a regression layer in the convolutional neural network, the second feature corresponding to each sub-image to a human head position corresponding to each sub-image and a corresponding confidence level of the human head position; and filtering, according to the corresponding confidence level, human head positions corresponding to the one or more sub-images, to acquire detected human head positions in the image.

20. The non-volatile storage medium according to claim 19, wherein segmenting the image into one or more sub-images comprises:

segmenting the image into one or more sub-images of a fixed size, wherein adjacent sub-images in the one or more sub-images partially overlap.

* * * * *